(12) United States Patent
Krishnarao et al.

(10) Patent No.: US 11,348,416 B2
(45) Date of Patent: May 31, 2022

(54) GROUP PERSONA BASED MACHINE REPLENISHMENT PREDICTION

(71) Applicant: INTERNATIONAL BUSINESS MACHINES CORPORATION, Armonk, NY (US)

(72) Inventors: Sharath Kumar Rudrapatna Krishnarao, Bangalore (IN); Amol Dhondse, Kothrud (IN); Manjula Golla Hosurmath, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 368 days.

(21) Appl. No.: 16/748,090

(22) Filed: Jan. 21, 2020

(65) Prior Publication Data

US 2021/0225133 A1 Jul. 22, 2021

(51) Int. Cl.
*G07F 19/00* (2006.01)
*G07F 9/02* (2006.01)
*G06F 16/242* (2019.01)
*G06F 16/332* (2019.01)
*G06N 3/08* (2006.01)

(52) U.S. Cl.
CPC .......... *G07F 19/209* (2013.01); *G06F 16/243* (2019.01); *G06F 16/3329* (2019.01); *G06N 3/08* (2013.01); *G07F 9/02* (2013.01)

(58) Field of Classification Search
CPC .. G06F 16/243; G06F 16/3329; G07F 19/209; G07F 9/02; G06N 3/08
See application file for complete search history.

(56) References Cited

U.S. PATENT DOCUMENTS

| | | | |
|---|---|---|---|
| 2011/0225087 A1 | 9/2011 | Agrawal | |
| 2016/0342911 A1* | 11/2016 | Kannan | G06Q 10/0631 |
| 2017/0140353 A1 | 5/2017 | Burdick | |
| 2018/0190082 A1* | 7/2018 | Chebrole | G07F 19/209 |
| 2019/0266554 A1* | 8/2019 | Lin | G06Q 10/087 |
| 2019/0370731 A1* | 12/2019 | Mota Manhaes | G06N 5/045 |

OTHER PUBLICATIONS

Disclosed Anonymously, "Providing Ease of Assured Cash Withdrawal by Reserving the Cash at Favorite ATM", An IP.com Prior Art Database Technical Disclosure, Nov. 28, 2018, 5 pages, IP.com No. IPCOM000256385D.
Sahi, et al., "Predicting Customers' Behavioral Intentions Toward ATM Services", Journal of Indian Business Research, Nov. 4, 2013, 2 pages, vol. 5, No. 4, ISSN: 1755-4195.

* cited by examiner

*Primary Examiner* — Laura A Gudorf
(74) *Attorney, Agent, or Firm* — Nicholas A. Welling

(57) ABSTRACT

A computer implemented method, computer program product, and computer system technique for optimizing automated teller machine (ATM) replenishment schedules to prevent an ATM from having insufficient product and also to prevent the inefficient use of product. The technique involves retrieving unstructured data from the users of the ATM. Then the technique analyzes the unstructured data using a natural language processing (NLP) model. The technique then inputs the results of the natural language processing deep neural network (DNN) trained with structured data. The result of the NLP and DNN analysis is a user persona. The user persona is used to generate the optimized ATM replenishment schedule.

20 Claims, 3 Drawing Sheets

GROUP PERSONA BASED MACHINE REPLENISHMENT PREDICTION

BACKGROUND OF THE INVENTION

The present invention relates generally to optimizing Automated Teller Machine (ATM) replenishment, and more specifically, to analyzing data using machine learning to optimize ATM replenishment schedules.

Optimal product management and uninterrupted service availability of ATMs is important for both customers of ATMs and ATM operators. ATMs that run out of product are, at best, an inconvenience for customers during a non-emergency situation. The ATM product outage further prevents the operator of the ATM from generating revenue and can result in a loss of goodwill with customers. Additionally, ATM operators do not want to overstock product in ATMs because static product does not generate revenue. ATM withdraws by customers are based on numerous factors including, but not limited to, location, weather, current events, political climate, and time of day. Each ATM has a unique withdraw pattern. The factors associated with the withdraw patterns make developing highly accurate models for ATM product requirement forecasting and the resulting replenishment schedules difficult. Simply using historical data associated with an ATM to develop a product replenishment schedule, does not consider the current events of the location or the behavioral patterns of the ATM customers in the location and therefore is inadequate.

SUMMARY

According to an embodiment of the present invention, a computer-implemented method for optimizing an automated teller machine (ATM) replenishment schedule, the computer-implemented method comprising: retrieving, by one or more processors, unstructured data associated with a plurality of users of an ATM; generating, by the one or more processors, a user persona of the ATM based on natural language processing of the unstructured data; retrieving, by the one or more processors, structured data associated with the plurality of users of the ATM; creating, by the one or more processors, a replenishment schedule based on a deep neural network analysis of the structured data and the user persona; and outputting the replenishment schedule to an ATM material supplier.

According to another embodiment of the present invention, a computer program product for optimizing an automated teller machine (ATM) replenishment schedule, the computer program product comprising: one or more non-transitory computer readable storage media and program instructions stored on the one or more non-transitory computer readable storage media, the program instructions comprising: program instructions to retrieve unstructured data associated with a plurality of users of an ATM; program instructions to generate a user persona of the ATM based on natural language processing of the unstructured data; program instructions to retrieve structured data associated with the plurality of users of the ATM; program instructions to create a replenishment schedule based on a deep neural network analysis of the structured data and the user persona; and program instructions to output the replenishment schedule to the ATM supplier.

According to another embodiment of the present invention, A computer system for optimizing an automated teller machine (ATM) replenishment schedule, the computer system comprising: one or more computer processors; one or more non-transitory computer readable storage media; program instructions stored on the one or more non-transitory computer readable storage media for execution by at least one of the one or more computer processors, the program instructions comprising; program instructions to retrieve unstructured data associated with a plurality of users of an ATM; program instructions to generate a user persona of the ATM based on natural language processing of the unstructured data; program instructions to retrieve, structured data associated with the plurality of users of the ATM; program instructions to create a replenishment schedule based on a deep neural network analysis of the structured data and user persona; and program instructions to output the replenishment schedule to the ATM supplier.

DETAILED DESCRIPTION

The embodiments depicted and described herein recognize the need to generate accurate Automated Teller Machine ("ATM") product replenishment schedules. The embodiments depicted and described herein recognize the benefits of analyzing unstructured, semi-structured and structured data to generate an ATM replenishment schedule for an ATM in a specific geographic location. The embodiments described herein are configurable to generate ATM replenishment schedules for large geographic regions, such as the Pacific Northwest or Midwest, or even states, for example Florida, Massachusetts, or Texas; or smaller geographic areas down to a few city blocks. Further, the embodiments allow an ATM operator to develop an ATM replenishment schedule and the amount of product to be loaded into an ATM based on historical data including but not limited to transactional data from an ATM; real-time data including but not limited to discussions on social media or trending news topics; and behavior of known ATM users, including but not limited to behavior analysis of the users of an ATM.

The embodiments described herein provide the capability for ATM operators to generate accurate ATM product replenishment schedules. In this regard, the embodiments prevent ATMs from being out-of-order due to insufficient product or being loaded with too much product resulting in inefficient use of product.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
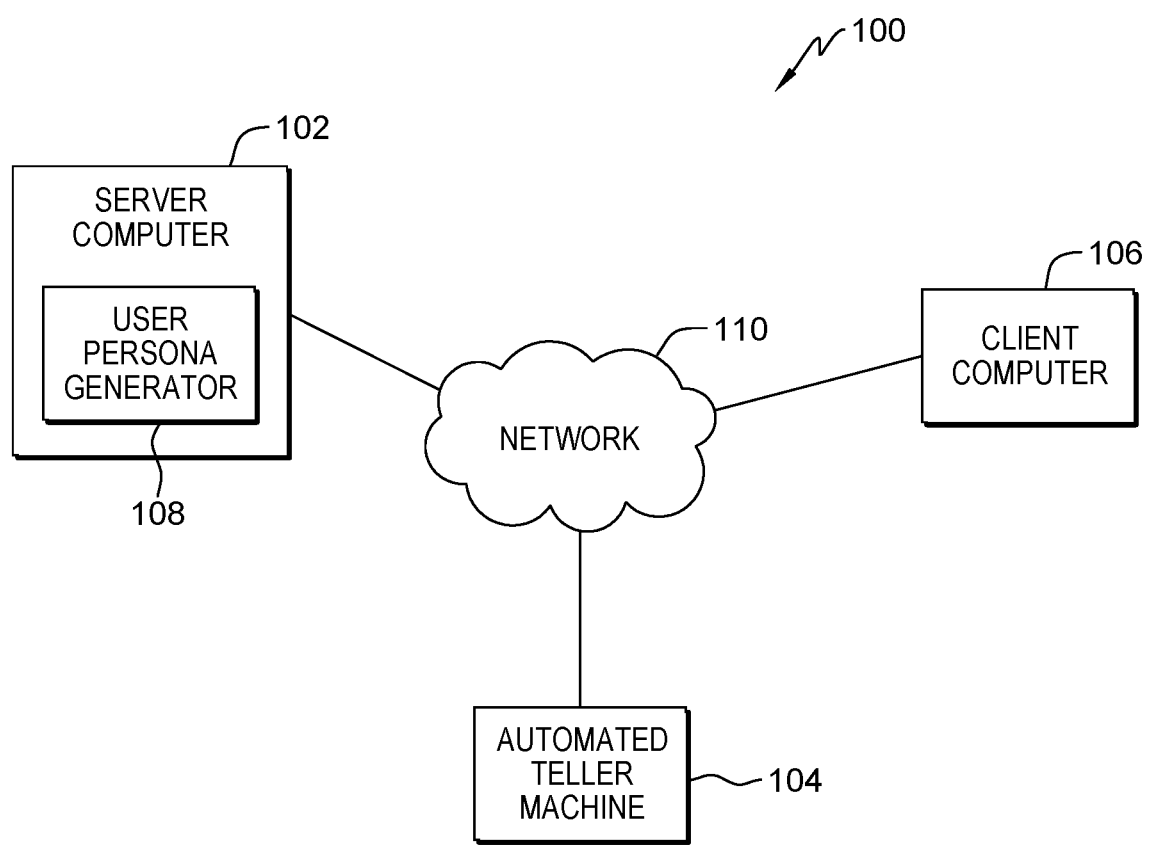
FIG. 1 is a block diagram showing an exemplary processing system to which the invention principles may be applied, in accordance with embodiments of the present invention.

FIG. 1 is a block diagram showing an exemplary processing system for a user persona generation environment 100 to which the invention principles may be applied. The user persona generation environment 100 comprises a user persona generator 108 operational on a server computer 102, a client computer 106, an ATM 104 and a network 110 supporting communication between the server computer 102, client computer 106, and ATM 104.

Server computer 102 can be a standalone computing device, management server, a web server, a mobile computing device, or any other electronic device or computing system capable of receiving, sending, and processing data. In other embodiments, server computer 104 can represent a server computing system utilizing multiple computers as a server system. In another embodiment, server computer 102 can be a laptop computer, a tablet computer, a netbook computer, a personal computer, a desktop computer, or any programmable electronic device capable of communicating with other computing devices (not shown) within user persona generation environment 100 via network 110.

In another embodiment, server computer 102 represents a computing system utilizing clustered computers and components (e.g., database server computers, application server computers, etc.) that act as a single pool of seamless resources when accessed within the user persona generation environment 100. Server computer 102 can include internal and external hardware components, as depicted and described in further detail with respect to FIG. 4.

ATM 104 can be a standalone product dispensing device. Further, ATM 104 comprises a programmable electronic device capable of communicating with other computing devices (not shown) via a network 110. Some embodiments of ATM 104 may dispense cash or funds, while others may dispense other products that require an accurate forecast. It should be noted that these other products may include, but are not limited to tokens, tickets, and foodstuffs.

Client computer 106 can be a standalone computing device, management server, a web server, a mobile computing device, or any other electronic device or computing system capable of receiving, sending, and processing data. In other embodiments, client computer 106 can represent a server computing system utilizing multiple computers as a server system. In another embodiment, client computer 106 can be a laptop computer, a tablet computer, a netbook computer, a personal computer, a desktop computer or any programmable electronic device capable of communicating with other computing devices (not shown) within user persona generation environment 100 via network 110.

In another embodiment, client computer 106 represents a computing system utilizing clustered computers and components (e.g., database server computers, application server computers, etc.) that act as a single pool of seamless resources when accessed within user persona generation environment 100. Client computer 106 can include internal and external hardware components, as depicted and described in further detail with respect to FIG. 4.

User persona generator 108 can be a framework for generating an ATM replenishment schedule by analyzing data based on a plurality of sources using a plurality of artificial intelligence techniques within the user persona generation environment 100 embodiment. It should be noted that although user persona generator 108 is located on the server computer 102, it can be located on client computer 106 and/or ATM 104. A User Persona is a profile of a group of individual ATM users based on behavioral analysis. The user persona generator 108 will be described in further detail in FIG. 2.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server computer 102, ATM 104, and client computer 106.

Figure 2:
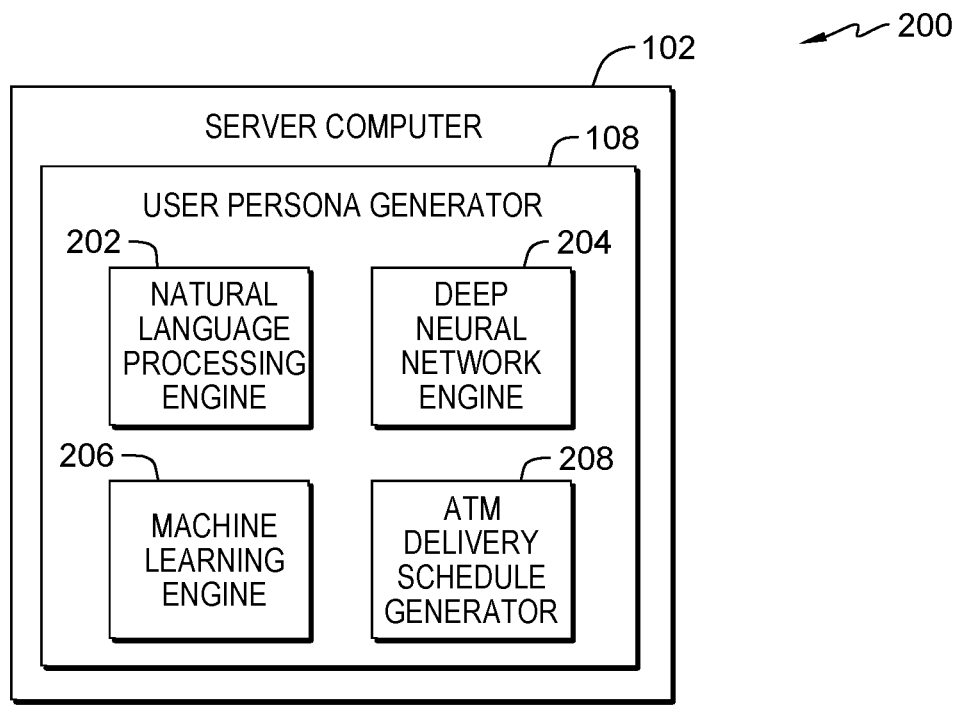
FIG. 2 is a block diagram showing an exemplary environment to which the present invention can be applied, in accordance with embodiments of the present invention.

FIG. 2 is a functional block diagram 200 depicting user persona generator 108 comprising natural language processing engine 202, deep neural network engine 204, machine learning engine 206, and ATM schedule generator 208.

Natural language processing (NLP) engine 202 of an embodiment of the present invention provides the capability to extract features from unstructured data. The unstructured data can be accessed from data storage servers (not shown) using the network 110. For the present embodiment, the NLP engine 202 uses a model that can analyze the unstructured data from sources including, but not limited to social media, weather reports, news articles, and reviews of businesses or events in a given geographic location. Further, the NLP engine 202 model provides for the identification of trending topics and events in a given geographic area. The topics and events can include, but are not limited to festivals, concerts, product releases, sporting events, fundraisers, and holiday seasons. The analysis of the unstructured data will be converted into quantifiable action via features for input into the deep neural network engine 204 (discussed in more detail below). The quantifiable action includes assigning weights to the above referenced topics and events. The weights can be an indication of the popularity of the event or topic and the likelihood of individuals attend an event and withdraw product from an ATM when attending said event. The NLP engine also provides the capability to self-learn using a constant feedback mechanism, one of ordinary skill in the art will appreciate the modalities to perform the self-learning actions.

Deep neural network (DNN) engine 204 of an embodiment provides the capability to analyze structured data and features extracted from the NLP engine 202, using a context-driven neural net model. The neural net model may be based on a lower level deep learning framework for example, but not limited to TensorFlow, CNTK, or Theano. Additionally, a higher level framework for example, but not limited to Keras API may run on top of the lower level framework, it should be noted that other deep learning frameworks may be used. A context-driven neural net model is a neural net model which provides for the input of a variety of data including real-time and historical product withdraws and current events. From that data the model provides the capability to decide when to replenish product in an ATM 104 and how much product to deliver to the ATM 104. The structured data analyzed by the model can be in the form of historical data of withdraws from at least one ATM 104 in a given geographic location. The historical data may comprise, but is not limited to time, date, amount, and frequency of user withdraws. Additionally, the DNN engine 204 can provide self-learning capabilities through various methods, including backpropagation, etc. Using the self-learning capabilities, the DNN engine 204 can identify feature compatibility and trends fine tuning the model to output a more accurate user persona.

Machine learning engine 206 of an embodiment provides the capability to analyze semi-structured data. The machine learning engine can be based on a scikit-learn framework, but it should be noted that other machine learning frameworks can be used. The semi-structured data can be, but is not limited to, banking statements from bank accounts of ATM 104 users in the geographical area, receipts from retail accounts of ATM 104 users, and text messages from social media accounts of the ATM 104 users. It should be noted that a user would grant permission for access to the semi-structured data prior to any access or use of the semi-structured data. The machine learning engine 206 can allow for the generation of user impulse ratings in light of the analysis of the semi-structured data. A user impulse rating is a rating of the likelihood of a user to withdraw product from an ATM 104, in light of the events and topics that have been identified in by the NLP engine 202. The user impulse ratings are used to adjust the output of the DNN engine 204 and create a more accurate user persona.

ATM delivery schedule generator 208 of an embodiment can provide an optimized ATM replenishment schedule based on the user persona generated by the analysis of the unstructured data, structured data, and semi-structured data. The User persona provides an accurate prediction of the amount of product consumed on any given day allowing the development of a replenishment schedule. The replenishment schedule comprises orders for more product for an ATM at specific dates and times. In one embodiment, ATM delivery schedule generator 208 can predict when the ATM 104 will require replenishment based on subtracting the user persona prediction from the amount of product currently in the ATM 104 and if the result is less than a predetermined minimum then the ATM delivery schedule generator 208 can generate a replenishment schedule for delivering additional product to the ATM 104.

Figure 3:
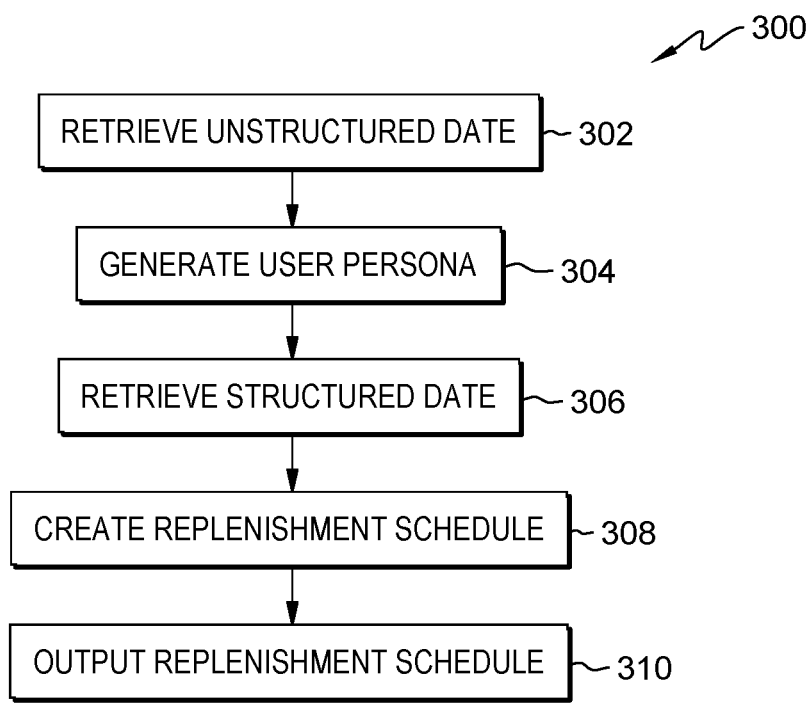
FIG. 3 is a flow diagram depicting operational steps of a method for optimizing an ATM replenishment schedule, in accordance with embodiments of the present invention.

FIG. 3 is a flow diagram depicting operational steps of a method 300 for optimizing an ATM replenishment schedule. Looking to step 302, the method 300 retrieves the unstructured data using network 110 wherein the unstructured data is associated with a plurality of ATM 104 users. Next, at step 304 an NLP engine 202 generates a user persona from the unstructured data. Next, at step 306, structured data is retrieved from the ATM 104, server computer 102, and/or client computer 106 wherein the structured data is associated with the plurality of ATM 104 users. Next, at step 308, create a replenishment schedule based on an analysis of the user persona and the structured data by the DNN 204. Next, at step 310 ATM delivery schedule generator 208 outputs the ATM replenishment schedule to an ATM 104 supplier.

Figure 4:
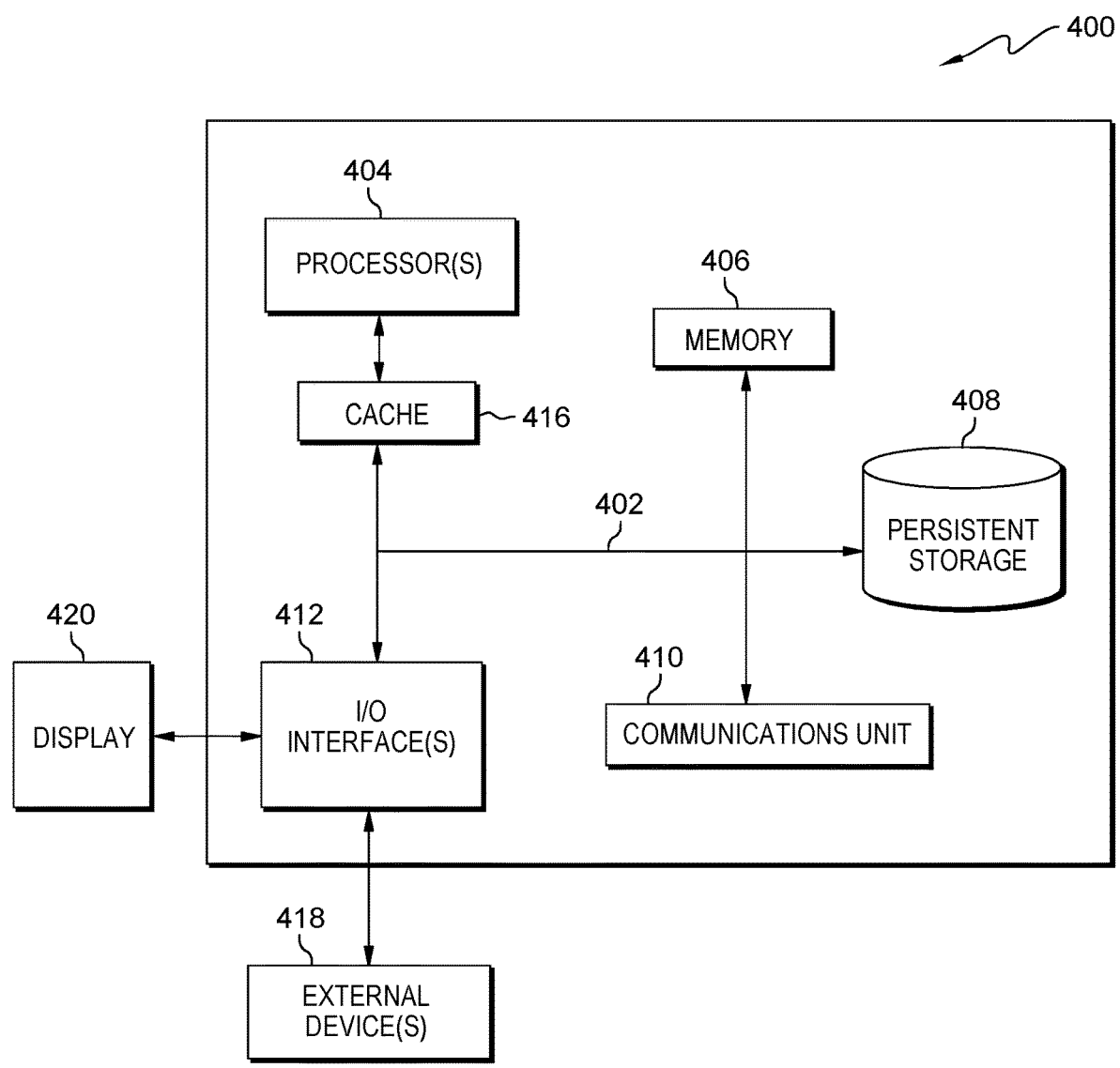
FIG. 4 is a block diagram of components of a prototype generation computer and a user prototype execution computer of an application prototype generation computing environment, in accordance with embodiments of the present invention.

FIG. 4 depicts computer system 400, an example computer system representative of server computer 102, ATM 104, and client computer 106. Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing an automated teller machine (ATM) replenishment schedule, the computer-implemented method comprising:
   retrieving, by one or more processors, unstructured data associated with a plurality of users of an ATM;
   generating, by the one or more processors, a user persona of the ATM based on natural language processing of the unstructured data;
   retrieving, by the one or more processors, structured data associated with the plurality of users of the ATM;
   creating, by the one or more processors, a replenishment schedule based on a deep neural network analysis of the structured data and the user persona; and
   outputting the replenishment schedule to an ATM material supplier.

2. The computer-implemented method of claim 1, further comprising:
   Retrieving, by the one or more processors, semi-structured data associated with the plurality of users of the ATM; and
   Adjusting, by the one or more processors, the user persona based on machine learning of the semi-structured data.

3. The computer-implemented method of claim 1, wherein the unstructured data is retrieved from social media.

4. The computer-implemented method of claim 1, wherein the structured data is historical use data retrieved from the ATM.

5. The computer-implemented method of claim 2, wherein the semi-structured data is retrieved from accounts, associated with the plurality of users of the ATM, comprising bank accounts, retail accounts and social media accounts.

6. The computer-implemented method of claim 1, wherein the deep neural network implements a self-learning model to extract one or more features.

7. The computer-implemented method of claim 2, wherein the machine learning implements a self-learning model.

8. A computer program product for optimizing an automated teller machine (ATM) replenishment schedule, the computer program product comprising:
   one or more non-transitory computer readable storage media and program instructions stored on the one or more non-transitory computer readable storage media, the program instructions comprising:
      program instructions to retrieve unstructured data associated with a plurality of users of an ATM;
      program instructions to generate a user persona of the ATM based on natural language processing of the unstructured data;
      program instructions to retrieve structured data associated with the plurality of users of the ATM;
      program instructions to create a replenishment schedule based on a deep neural network analysis of the structured data and the user persona; and
      program instructions to output the replenishment schedule to an ATM supplier.

9. The program product of claim 8, further comprising:
   program instructions to retrieve semi-structured data associated with the plurality of users of the ATM; and
   program instructions to adjust the user persona based on machine learning of the semi-structured data.

10. The computer program product of claim 8, wherein the unstructured data is retrieved from social media.

11. The computer program product of claim 8, wherein the structured data is historical use data retrieved from the ATM.

12. The computer program product of claim 9, wherein the semi-structured data is retrieved from accounts, associated with users of the ATM, comprising bank accounts, retail accounts and social media accounts.

13. The computer program product of claim 8, wherein the deep neural network implements a self-learning model to extract one or more features.

14. The computer program product of claim 9, wherein the machine learning implements a self-learning model.

15. A computer system for optimizing an automated teller machine (ATM) replenishment schedule, the computer system comprising:
   one or more computer processors;
   one or more non-transitory computer readable storage media;
   program instructions stored on the one or more non-transitory computer readable storage media for execution by at least one of the one or more computer processors, the program instructions comprising;
      program instructions to retrieve unstructured data associated with a plurality of users of an ATM;
      program instructions to generate a user persona of the ATM based on natural language processing of the unstructured data;
      program instructions to retrieve, structured data associated with the plurality of users of the ATM;
      program instructions to create a replenishment schedule based on a deep neural network analysis of the structured data and user persona; and
      program instructions to output the replenishment schedule to an ATM supplier.

16. The computer system of claim 15, further comprising:
   program instructions to retrieve semi-structured data associated with the plurality of users of the ATM; and
   program instructions to adjust the user persona based on machine learning of the semi-structured data.

17. The computer system of claim 15, wherein the unstructured data is retrieved from social media.

18. The computer system of claim 15, wherein the structured data is historical use data retrieved from the ATM.

19. The computer system of claim 16, wherein the semi-structured data is retrieved from accounts associated with users of the ATM, comprising bank accounts, retail accounts, and social media accounts.

20. The computer system of claim 15, wherein the deep neural network implements a self-learning model to extract one or more features.

* * * * *